US008985598B2

(12) United States Patent
Engum et al.

(10) Patent No.: US 8,985,598 B2
(45) Date of Patent: Mar. 24, 2015

(54) CART FOR TRANSPORTING, STORING AND CHARGING MEDICAL MANIKINS

(71) Applicant: Indiana University Health, Inc., Indianapolis, IN (US)

(72) Inventors: Scott A Engum, Indianapolis, IN (US); David C. Luter, Carmel, IN (US); Phillip H. Canada, Fishers, IN (US); Paul M. Collins, Indianapolis, IN (US); Jennifer Dwyer, Indianapolis, IN (US)

(73) Assignee: Indiana University Health, Inc., Indianapolis, IN (US)

( * ) Notice: Subject to any disclaimer, the term of this patent is extended or adjusted under 35 U.S.C. 154(b) by 0 days.

(21) Appl. No.: 14/164,899

(22) Filed: Jan. 27, 2014

(65) Prior Publication Data
US 2014/0138926 A1 May 22, 2014

Related U.S. Application Data

(63) Continuation of application No. 13/106,162, filed on May 12, 2011, now abandoned.

(51) Int. Cl.
*B62B 3/00* (2006.01)
*B62B 7/00* (2006.01)
(Continued)

(52) U.S. Cl.
CPC . *B62B 3/02* (2013.01); *B62B 3/005* (2013.01); *B62B 2202/42* (2013.01); *B62B 2206/06* (2013.01); *B62B 2301/12* (2013.01)
USPC ......................... 280/47.35; 280/47.41; 280/35

(58) Field of Classification Search
CPC ............ B62B 3/00; B62B 3/02; B62B 3/002; B62B 3/10; B62B 3/006; B62B 3/005; B62B 3/102; B62B 5/0026; B62B 5/0033; B62B 5/0036; B62B 5/0053; B62B 2202/42; B62B 2203/07; B62B 2203/073; B62B 2203/70; A47F 7/00; A47F 7/0028; A47F 7/0035; A47F 5/00; A47B 81/00; A47B 87/0207; A47B 87/0246; A47B 87/0223; A47B 87/0215; A47B 45/00; A47B 57/00; A47B 57/06
USPC ........ 280/47.35, 47.41, 79.11, 79.3, 79.2, 35; 211/13.1, 188, 194, 207, 208; 318/443, 318/445, 466, 139
See application file for complete search history.

(56) References Cited

U.S. PATENT DOCUMENTS 2,272,819 A * 2/1942 Poetsch et al. ................. 312/198
3,777,673 A * 12/1973 Blazey et al. .................. 108/27
(Continued)

OTHER PUBLICATIONS

Webpage for AEDSuperstore selling Life/form Hard Sided Manikin Torso Carry Case: www.aedsuperstore.com/life-form-hard-sided-torso-manikin-carry-case.html.

*Primary Examiner* — J. Allen Shriver, II
*Assistant Examiner* — James M Dolak
(74) *Attorney, Agent, or Firm* — Woodard, Emhardt, Moriarty, McNett & Henry LLP

(57) ABSTRACT

Disclosed is a cart having a number of stretcher-like platforms suitable for placement and storage of a medical training manikin. The platforms are mounted to the cart such that they may be substantially pulled out in a direction parallel to their width, so as to facilitate easy loading and unloading of the manikins as well as to provide user access to the manikin when in its proper position on the platform if needed. The cart may include a series of electrical connectors for powering and/or charging the manikins during storage. Additionally, the electrical connectors may be selectively fed by an on-board battery which would enable the manikins to be powered and/or charged even during transport. The cart also preferably includes a motorized lift system, powered by an on-board battery, which raises and lowers the various platforms to allow the height of each platform to be brought to a loading level.

18 Claims, 6 Drawing Sheets

(51) Int. Cl.
*B62B 1/00* (2006.01)
*B62B 3/02* (2006.01)

(56) References Cited

U.S. PATENT DOCUMENTS

| | | | |
|---|---|---|---|
| 3,908,562 A | 9/1975 | Wittschen | |
| 4,088,202 A | 5/1978 | Costello | |
| 4,373,761 A * | 2/1983 | Hansberry, Jr. | 312/249.12 |
| 4,620,637 A | 11/1986 | Karashima | |
| 4,895,382 A | 1/1990 | Andersson | |
| 5,443,017 A * | 8/1995 | Wacker et al. | 108/3 |
| 5,447,099 A | 9/1995 | Adams et al. | |
| 5,611,423 A | 3/1997 | Graham | |
| 5,642,898 A | 7/1997 | Wise | |
| 5,685,442 A | 11/1997 | Yoshino et al. | |
| 6,008,621 A | 12/1999 | Madison et al. | |
| 6,079,719 A | 6/2000 | Tisbo et al. | |
| 6,218,796 B1 * | 4/2001 | Kozlowski | 318/280 |
| 6,368,048 B2 | 4/2002 | Womble et al. | |
| 6,431,319 B1 | 8/2002 | Myers et al. | |
| 6,493,217 B1 | 12/2002 | Jenkins, Jr. | |
| 6,663,202 B2 | 12/2003 | Spann | |
| 7,111,852 B2 | 9/2006 | Woods et al. | |
| 7,242,577 B2 | 7/2007 | Sween et al. | |
| 7,562,883 B2 * | 7/2009 | Livengood et al. | 280/87.01 |
| 7,584,973 B2 * | 9/2009 | Brager | 280/47.35 |
| 7,857,329 B2 | 12/2010 | Cai | |
| 8,763,820 B2 * | 7/2014 | Hanley | 211/88.01 |
| 2009/0166991 A1 * | 7/2009 | Cai | 280/47.35 |

* cited by examiner

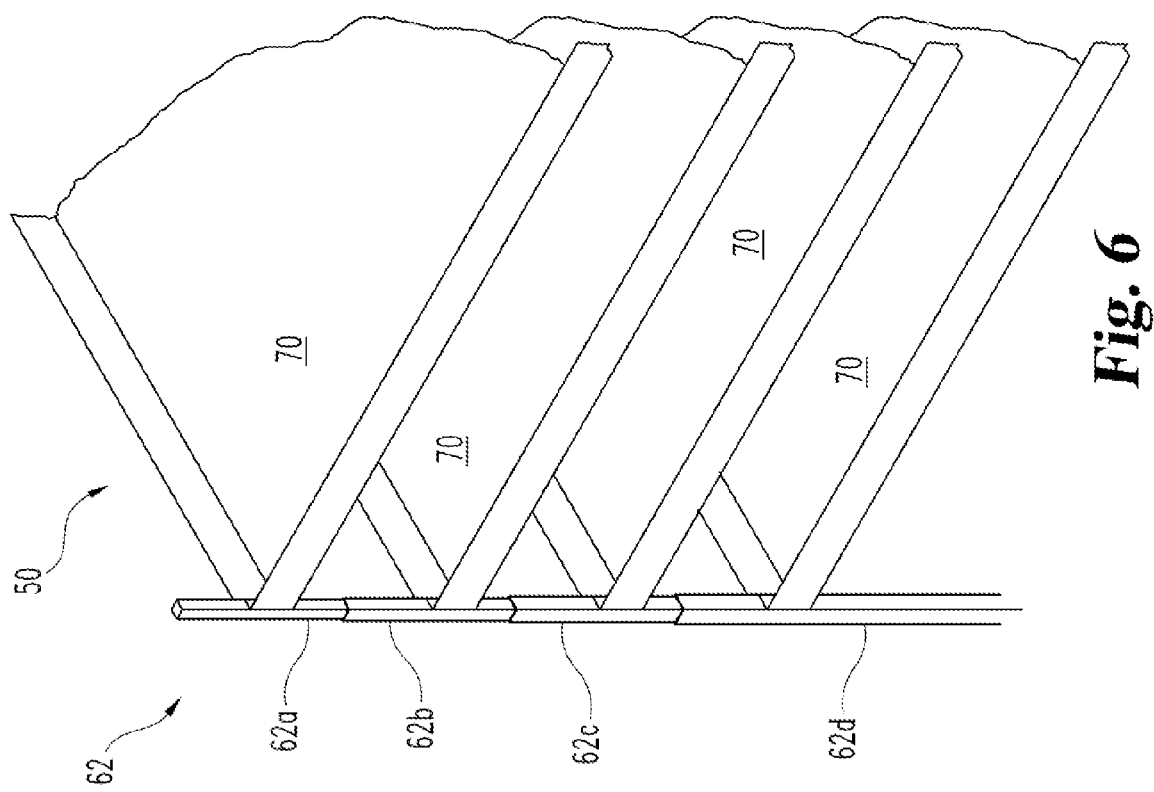

CART FOR TRANSPORTING, STORING AND CHARGING MEDICAL MANIKINS

CROSS REFERENCE TO RELATED APPLICATIONS

The present application is a continuation patent application to U.S. patent application Ser. No. 13/106,162 filed May 12, 2011, which is hereby incorporated by reference in its entirety to the extent not inconsistent.

FIELD OF THE INVENTION

The present invention relates generally to a utility cart and, more particularly, to a cart having numerous platforms for storing, transporting, and charging medical manikins.

BACKGROUND

The present invention is directed to improvements in training manikins of the type used by hospitals, medical schools, and other similar facilities. Training manikins are well known in the art and are meant to simulate conditions in human patients which are to be treated by medical personnel. Thus, the typical training manikin is of the size, shape and weight of a human subject and typically includes analog mechanical structures which correspond to the human organs or body parts which are being manipulated or worked upon by the medical student or trainee. Additionally, many modern manikins include complex actuators, motors, speakers and the like which simulate human movement and/or sounds as well as computer systems to control that movement in accordance with a simulation of a selected disease or condition. Exemplary medical manikins are manufactured by companies such as Laerdal Medical AS, Armstrong Medical, Inc., and BLS Medical, just to name a few.

Typically, these medical manikins present several problems. First, these manikins are expensive to purchase and often easily damaged. Therefore, when transporting these manikins from place to place users must pay particular attention to ensure that the manikins are not damaged. Additionally, medical manikins are cumbersome to transport due to their size, shape, and weight. This is particularly the case in dealing with full sized manikins. Despite these problems, end users are not provided with an efficient and customized method for transporting and/or storing these expensive and delicate pieces of equipment.

Therefore it is an object of the present invention to provide a cart for transporting and/or storing, a number of medical manikins. It is a further object of the invention to provide a cart for recharging a number of medical manikins during transportation and/or storage. It is a still further object of the invention to provide a cart for easy loading and unloading of a medical manikin while still providing for the simultaneous storage of a plurality of medical manikins.

SUMMARY

The present disclosure includes certain embodiments for a medical manikin cart, and more particularly a cart for storing, transporting, and charging medical manikins. In certain embodiments of the present invention, a cart for storing and transporting medical manikins having multiple horizontally extendable platforms is provided. In one form, the cart includes at least three horizontally extendable platforms arranged in a vertical stack. Additionally, the cart is preferably mounted upon casters to provide for the largest range of maneuverability.

A preferred embodiment of the present disclosure comprises a medical manikin cart which includes two or more height adjustable platforms which horizontally extend from the cart. The cart includes motors for controllably adjusting the height of the various platforms and a power source which drives the motor.

In further forms, the medical manikin cart includes electrical outlets and/or medical manikin charging connectors which enable the manikins to be re-charged during storage and transportation.

Further objects, features and advantages of the present invention shall become apparent from the detailed drawings and descriptions provided herein. Each embodiment described is not intended to address every object described herein, and each embodiment does not include each feature described. Some or all of these features may be present in the corresponding independent or dependent claims, but should not be construed to be a limitation unless expressly recited in a particular claim.

BRIEF DESCRIPTION OF THE DRAWINGS

FIG. 6 is a partial enlarged view of the vertical support poles and corresponding support platforms of the medical manikin cart of FIG. 5.

DETAILED DESCRIPTION

Figure 1:
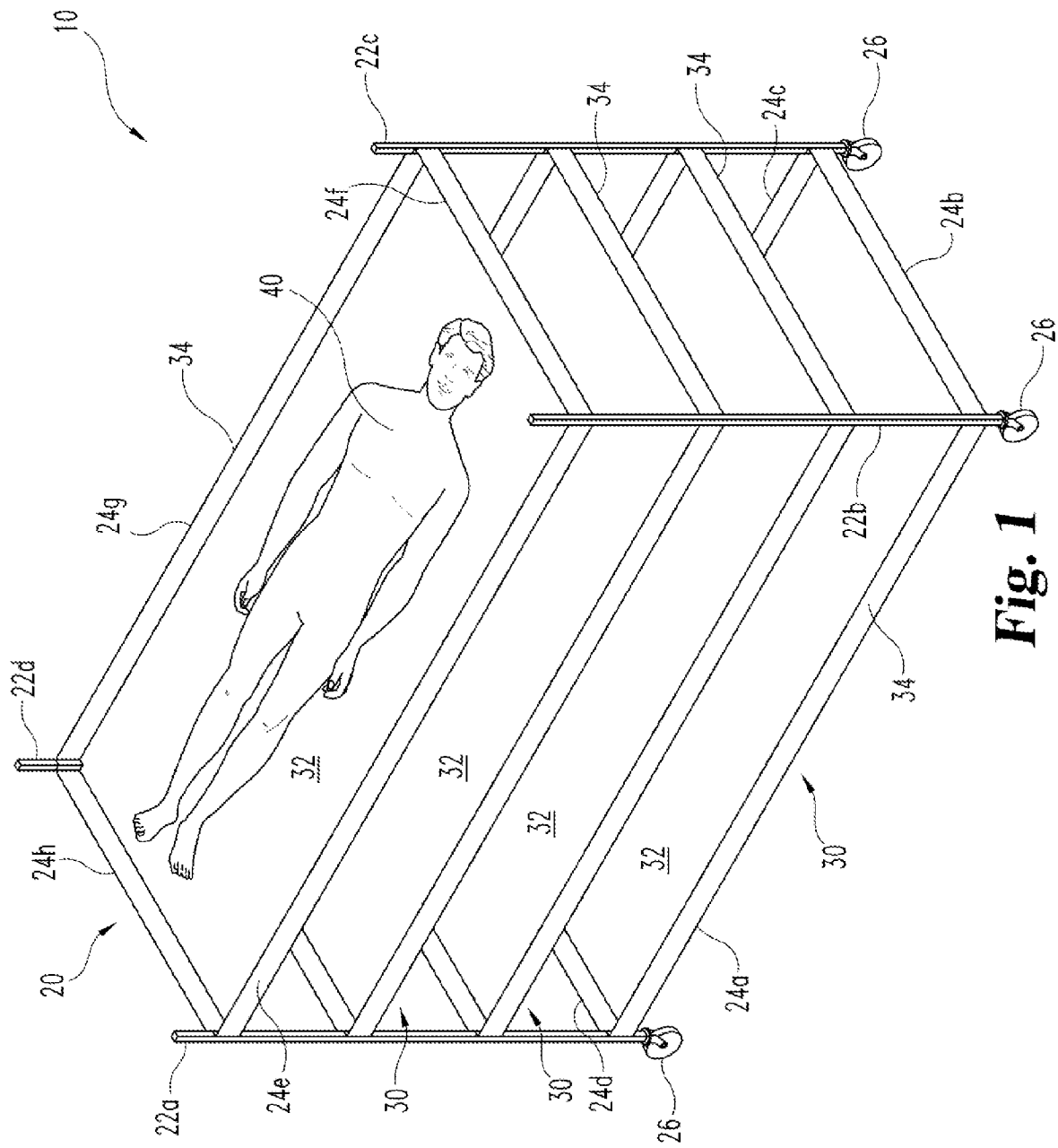
FIG. 1 is a perspective view of a medical manikin cart according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. Additionally, in the following description, like reference characters designate like or corresponding parts throughout the several views.

Disclosed is a cart having a number of platforms suitable for placement and storage of a medical training manikin. The cart may take many forms, such as a configuration having a single vertical stack of several platforms or a configuration in which dual vertical stacks of platforms are positioned next to one another. The platforms are mounted to the cart such that they may be substantially pulled out in a direction parallel to their width, so as to facilitate easy loading and unloading of the manikins as well as to provide user access to the stored manikins when in their proper position on the platforms if needed. In addition, in one further form, the cart includes a series of electrical connectors, which may be electrical outlets, proprietary charging connectors, or some other type of electrical connection for powering and/or charging the manikins during storage. According to this form, each connector is fed by a main power source which is connected to a power supply, such as a wall outlet. In an improved form, the electrical connectors may be selectively fed by an integrated on-board battery which would enable the manikins to be powered and/or charged even during transport, with the on-board battery being regenerated when the cart is plugged into a wall outlet during storage or other period of non-use. In a still further form, the cart includes a motorized lift system operating off the on-board battery which raises and lowers the various platforms to allow the height of each platform to be brought to a loading level, such as approximately waist high. Given the real-life weight of some medical training manikins, this would enable users to load the manikins efficiently and without additional personnel or unnecessary risk of injury.

A manikin transportation and storage cart 10 is illustrated according to one form of the present invention in FIG. 1. As seen in FIG. 1, the cart 10 comprises a generally tubular light weight frame 20. Frame 20 may be constructed principally of one or more of several suitable materials including aluminum, polyvinyl chloride pipe, plastic, or any other sufficiently low-cost, light-weight rigid material. Frame 20 is comprised principally of four vertical support poles 22a, 22b, 22c, and 22d (collectively 22) and eight horizontal support members 24a, 24b, 24c, 24d, 24e, 24f, 24g, and 24h (collectively 24). Cart 10 also includes four ground engaging portions 26, which, in the illustrated embodiment are wheel and caster assemblies which are attached to frame 20 at points adjacent to the four lower corners of frame 20.

Figure 2:
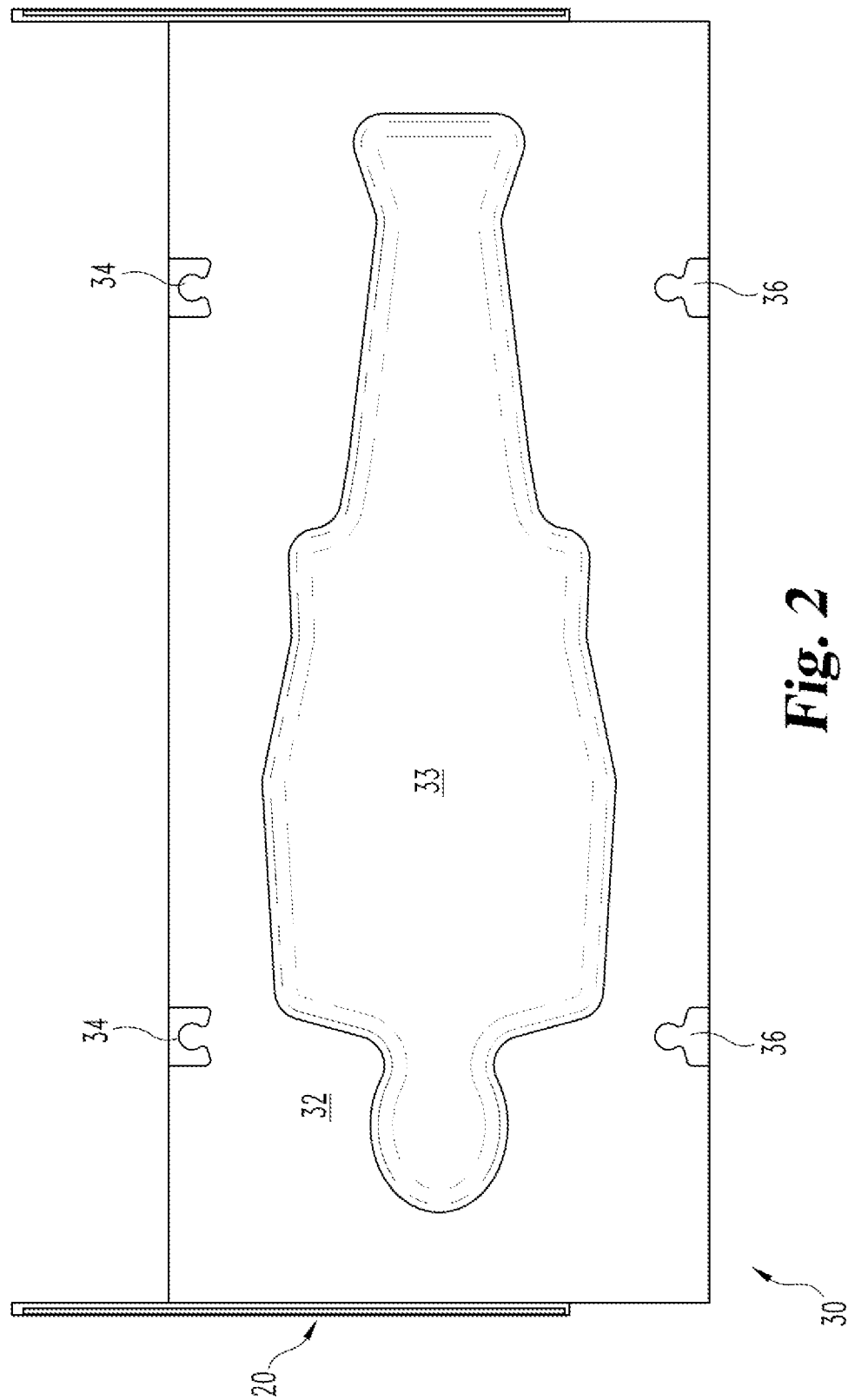
FIG. 2 is a partial enlarged view of the support platforms of the medical manikin cart of FIG. 1.

Mounted to frame 20 are two or more support platforms 30 which are secured, at various points along their perimeter, to the vertical support poles 22, horizontal support members 24, and/or otherwise to frame 20. Support platforms 30 each include a generally rectangular shaped horizontal support surface 32 which is mounted to a sub-frame 34 which surrounds the perimeter of surface 32, and may also provide for additional support underneath surface 32. In the illustrated form, surface 32 is a flat surface for supporting an object, such as a medical manikin 40 (shown in FIG. 1). However, in alternate forms, such as that shown in FIG. 2, surface 32 may be a rigid, semi-rigid, or taut surface which is designed to conform, either generally or specifically, to the shape of the underside of one or more medical manikins to provide for better support and to assist in maintaining the manikin in a desired position during transportation and storage. As shown in FIG. 2, support surface 32 of platform 30 includes a concave area 33 generally in the shape of an average sized human being for receiving a medical manikin and securely storing it. Support platforms 30 may also include securement devices, such as retractable securement straps 34 and anchors 36 for further securing the medical manikin to cart 10. It shall be appreciated that the concave area 33 of support surface 32 may be in many alternate shapes as desired to conform to the shape of a selected medical manikin or similar device.

Figure 3:
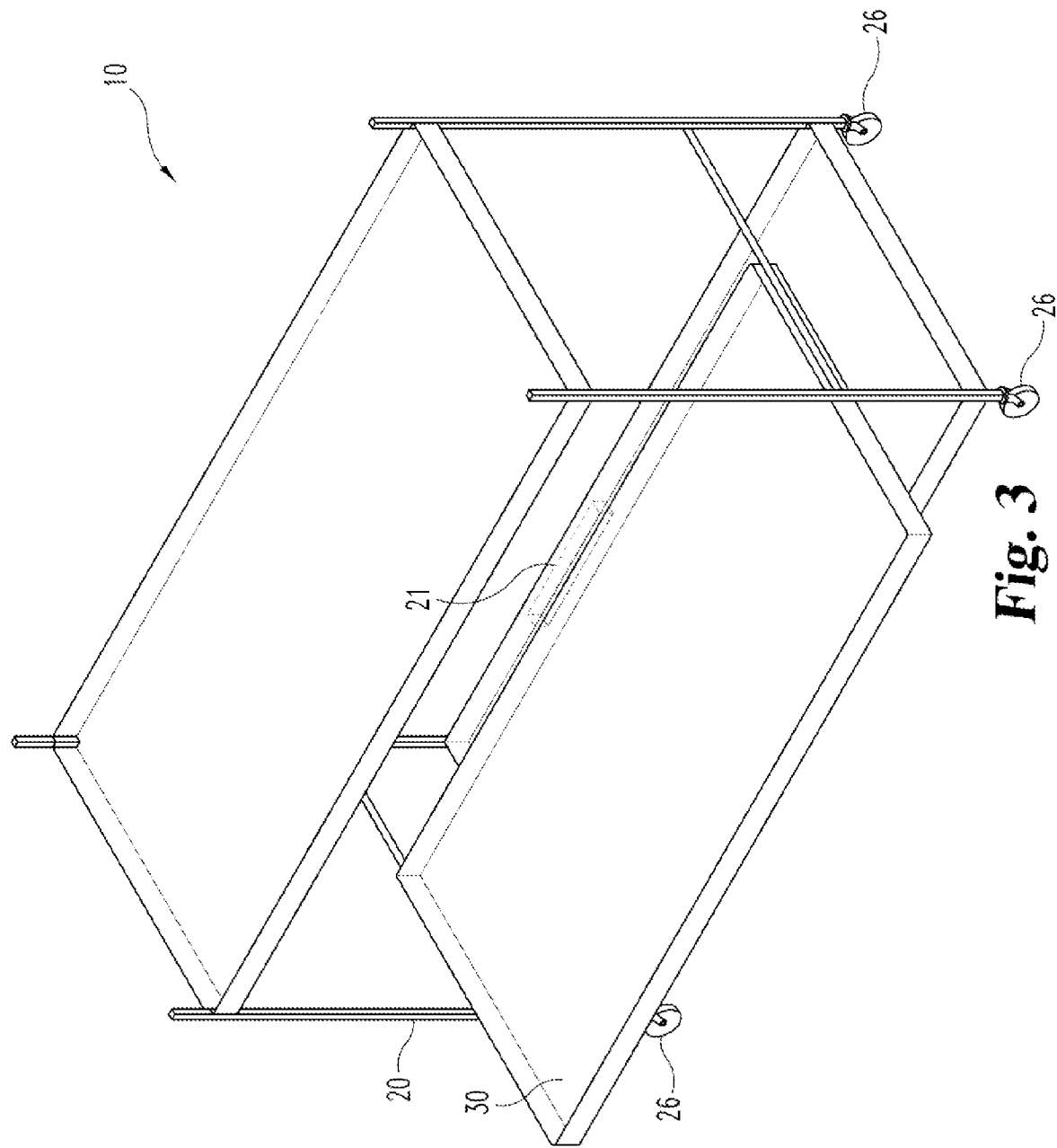
FIG. 3 is a perspective view of a medical manikin cart with a single platform in its horizontally extended position according to one embodiment of the present invention.
Figure 4:
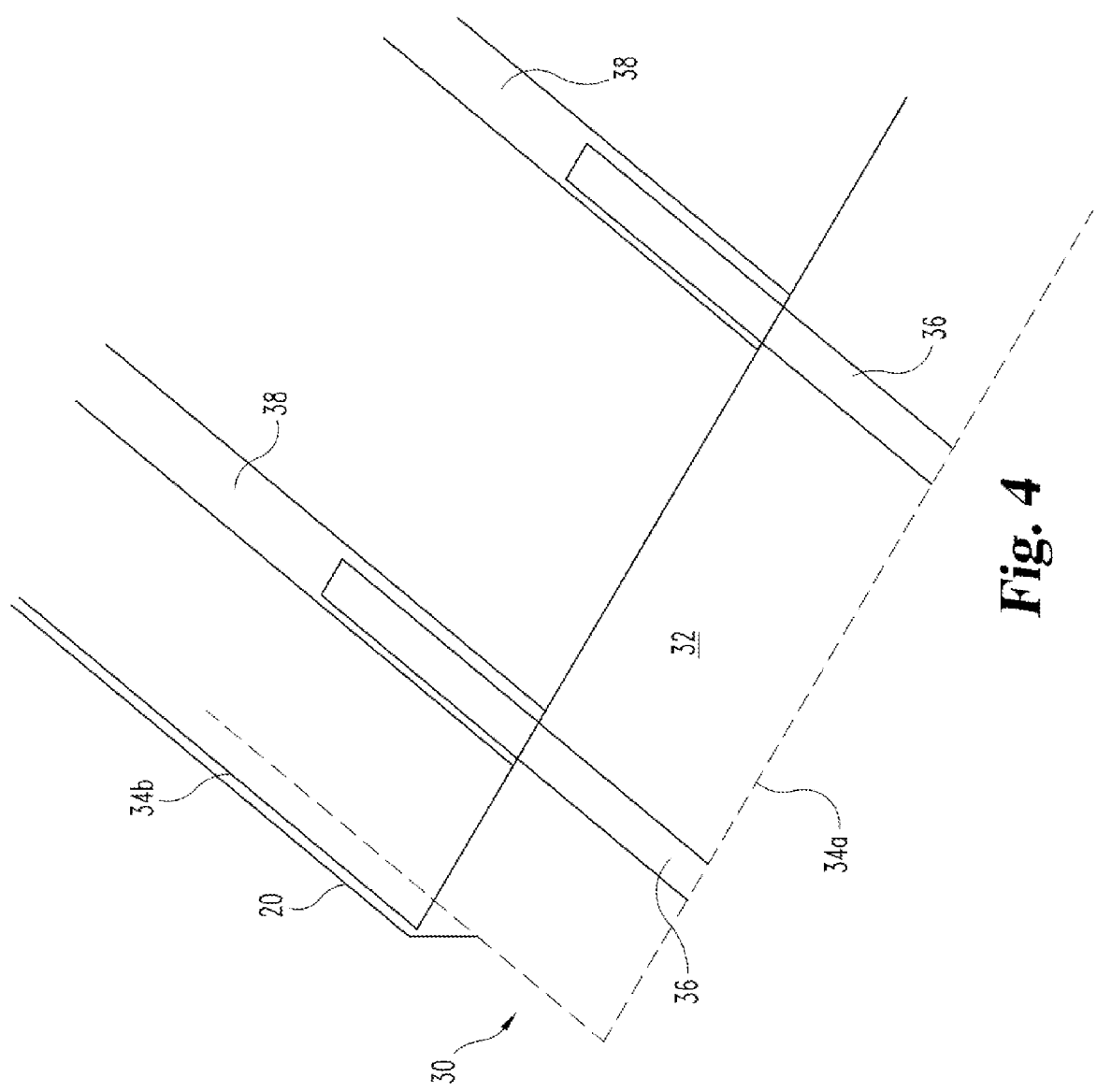
FIG. 4 is a partial enlarged view of the mechanics underlying a support platform of the medical manikin cart of FIG. 1.

FIG. 3 is another perspective view of medical manikin cart 10 with a single platform 30 in its horizontally extended position. In some forms, given the weight of the manikins and the degree to which the support platforms 30 are extended, a counterbalance, such as counterbalance 21, may be utilized on one or more sides of the cart to ensure that the cart will not tip over when a manikin is loaded onto an extended support platform. The counterbalance may be an iron or steel weight or alternatively may be integrated into the frame 20. Preferably, the counterbalance is positioned as far from the center-line of the cart 10 as possible to minimize the overall weight of the cart 10 while maximizing its stability. As can be seen in FIG. 4, a close-up view of the attachment of one of support platforms 30 to frame 20 can be seen in detail. The actual support surface 32 is shown in broken lines so that the necessary components on its underside may be illustrated. In this form, the sub-frame 34 of support platform 30 is attached to frame 20 such that support surface 32 may be slid in and out in a horizontal direction to allow for access to and easy placement and removal of the medical manikins. Preferably, the support surface 32 may be slid out a distance which represents over 50% of its total width in that direction. More preferably, the support surface 32 may be slid out a distance which represents over 75% of its total width in that direction. Even more preferably, the support surface 32 may be slid out a distance which represents approximately its entire width in that direction. To provide this functionality, in the embodiment illustrated, the sub-frame 34 is divided into a movable inner sub-frame 34a and an outer static sub-frame 34b. The inner sub-frame 34a includes multiple rails 36 attached to its underside which extend horizontally along the direction of travel, while the outer subframe 34b includes corresponding guide tracks 38 on its opposing upper surface. The inner sub-frame 34a is then mounted within the outer sub-frame 34b by having rails 36 placed within their corresponding guide tracks 38. This preferably occurs when rails 36 are slid into guide tracks 38 with the assistance of internal bearings (not shown) which serve to reduce friction and provide for a desirable smooth gliding motion. Furthermore, the combination of rails 36 and guide tracks 38 preferably include an extension retention mechanism, such as a retaining plate, to prevent the rails 34, and ultimately the inner sub-frame 34a and support surface 32, from being slid too far out of guide tracks 38. Alternate mechanisms for providing the slide-out functionality of platforms 30 may be utilized. Additionally, it shall be appreciated that the sub-frame 34 is fixed to frame 20 of cart 10 by having its outer static subframe 34b securely attached to frame 20 using commonly known techniques.

Figure 5:
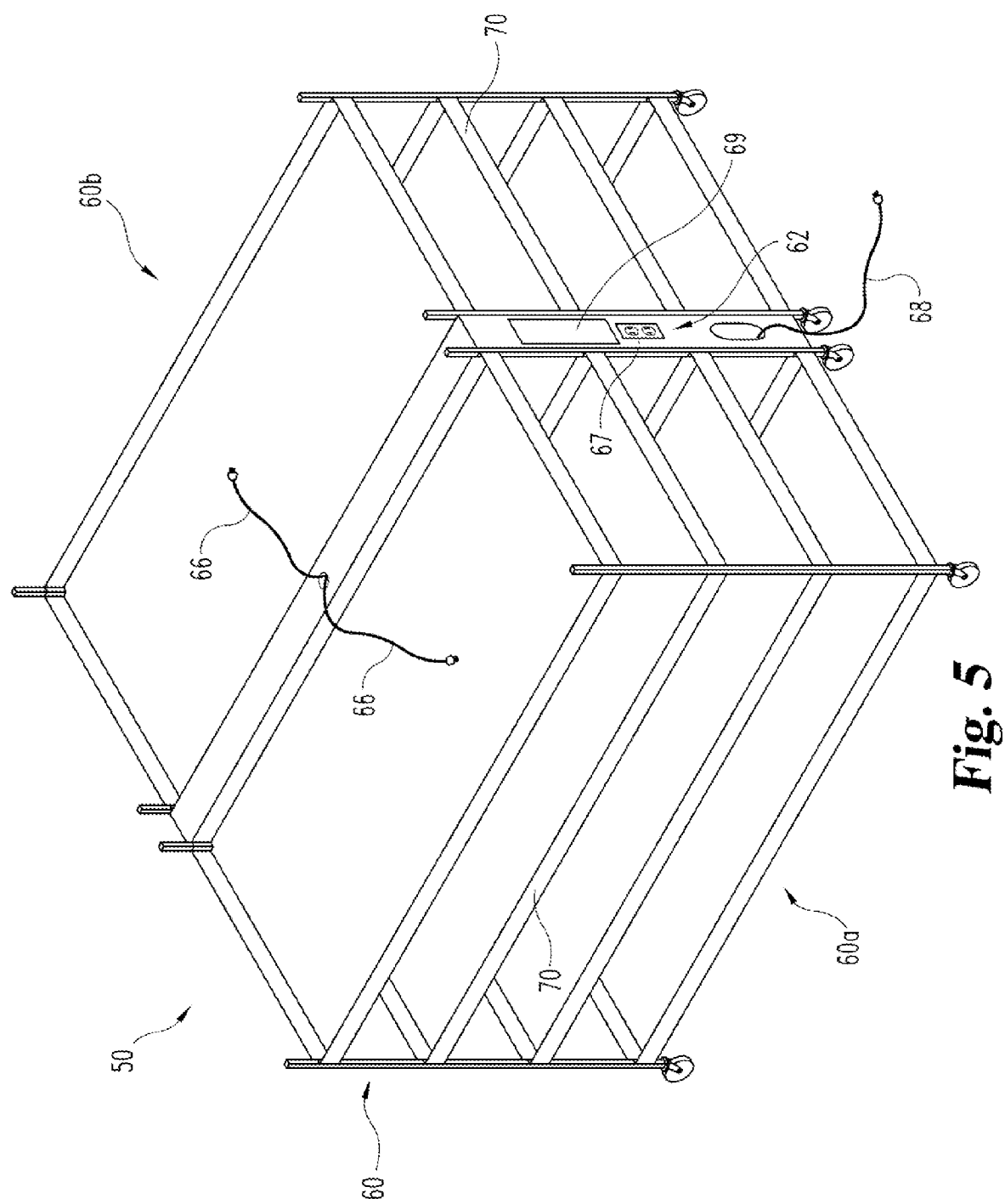
FIG. 5 is a perspective view of a six-platform medical manikin cart according to another embodiment of the present invention.

Turning to FIG. 5, a manikin transportation and storage cart 50 is illustrated according to another form of the present invention. Cart 50 comprises a generally tubular light weight frame 60. Frame 60 is comprised principally of two sections 60a and 60b each comprising four vertical support poles and eight horizontal support members. Each section 60a and 60b includes two or more horizontally extendable support platforms 70. In the illustrated embodiment, each section includes three support platforms 70. Each support platform 70 is mounted either directly or indirectly to the vertical support poles of its respective section of frame 60 such that its height may be mechanically raised and lowered to provide for easy loading and unloading of medical manikins. Additionally, frame 60 provides a central storage compartment 62, located between frame sections 60a and 60b. Compartment 62 provides space for a power supply (not shown), motor (not shown), charging connectors 66, electrical power outlets 67, cart power plug 68, and control panel 69. Power supply 64 is preferably a set of one or more rechargeable batteries, which provide power to motor 65 for driving cart 50, raising and lowering the respective support platforms 70, as well as extending and retracting support platforms 70 if desired. In certain arrangements, one or more of these functions is provided by additional independent motors which are not shown to preserve clarity. Additionally, power supply 64 provides electricity to charging connectors 66 and electrical power outlets 67 to enable them to deliver power to the various devices connected to them. Charging connectors 66 may be standard electrical connections or may be one or more of any number of proprietary or other types of connectors utilized by the various medical manikins which are desired to be transported. Additionally, electrical power outlets 67 may be provided which allow for the direct connection of medical manikin power supplies to cart 50. Finally, cart 50 includes a cart power plug 68, which is shown to be a standard male three-prong 110V electrical plug, but may be another type of electrical connection operable to provide a regenerative charge to on-board power supply 64 from an external power source. Additionally, control panel 69 provides for controls for the various functions of cart 50 as well as providing status indicators for various criteria, such as the level of charge of power supply 64, amongst others. Furthermore, these components within compartment 62 provide counterbalance weight to ensure that the cart 50 does not tip over when being loaded.

Turning to FIG. 6, with continued reference to FIG. 5, one exemplary mechanism which provides for this height adjustability is illustrated. It shall be appreciated that other methods of providing for height adjustability may be utilized, but that only the preferred method will be illustrated for purposes of clarity. As can be seen, each horizontal support member 62 is divided into a number of sections 62a, 62b, and 62c, with a support platform 70 being secured to a fixed point on each section of horizontal support member 62. Additionally, section 62a fits within the inner portion of section 62b, which similarly fits within the inner portion of 62c, and portion 62c is mounted within base support portion 62d. As such, vertical support member 62 takes on a telescoping length. Linear actuators within sections 62b, 62c and 62d provide for controlled movement of the height of the various support platforms 70. Similar arrangements in the other vertical support members 62 of cart 50 work in concert to provide for height adjustability while maintaining the horizontal orientation of the platforms 70. The linear actuators are powered by power supply 64 and are controlled by control panel 69.

The benefits derived from the transportation and storage cart of the present invention are evident at this stage. Expensive and delicate medical manikins may be easily transferred to and from the cart. Once loaded onto the cart the manikins may be securely stored, recharged, and/or transported to another location without fear of damage. In addition, more manikins may be safely stored in a smaller place, without fear of damage while still remaining within easy access when needed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the invention as described herein and/or by the following claims are desired to be protected.

What is claimed is:

1. A cart for storing and transporting medical manikins comprising:
   a frame supported off the ground by a set of wheels to facilitate transportability of the cart;
   a plurality of generally rectangular support platforms mounted to said frame in a vertical stack, each of said support platforms comprising a generally horizontal surface suitable for receiving a medical manikin on an upper surface of said platform;
   wherein at least one platform in said plurality is mounted to said frame so as to be laterally extendable from a retracted position in vertical alignment with the remaining support platforms in said plurality to an extended position in which said first platform is displaced a distance of at least one-half of a first width of the first platform in a horizontal direction along said first width and generally away from a central axis of said cart;
   wherein the upper surface of at least one of said support platforms is molded so as to generally conform to the substantially human-like shape of said medical manikin;
   a motor mounted to said cart, the motor configured to adjust the height of at least one of said plurality of support platforms with respect to said cart; and
   a battery for storing electrical power mounted to said frame, said battery providing power to said motor.

2. The cart of claim 1, wherein said plurality of generally rectangular support platforms includes at least three support platforms.

3. The cart of claim 2, wherein said cart includes a second plurality of generally rectangular support platforms mounted to said frame in a second vertical stack, each of said support platforms in said second plurality comprising a generally horizontal surface suitable for receiving a medical manikin on said upper surface.

4. The cart of claim 3, wherein said second plurality of generally rectangular support platforms are mounted to said cart such that one of their longest sides are parallel to and adjacent to the longest sides of said plurality of generally rectangular support platforms.

5. The cart of claim 1, further comprising a counterbalance weight attached to said frame.

6. The cart of claim 5, wherein said counterbalance weight is positioned on the opposite side of the central axis of said cart with respect to the outermost end of said first support platform into said extended position.

7. The cart of claim 4, further comprising two counterbalance weights positioned on opposite sides of the central axis of said cart.

8. The cart of claim 1, further comprising an electrical cord for carrying electrical power having a first end including a plug for insertion into an electrical outlet and a second end providing power to a plurality of electrical outlets for distributing electrical power therefrom, wherein said plurality of electrical outlets are integrated into said frame or said plurality of support platforms.

9. The cart of claim 8, wherein said plurality of electrical outlets includes at least one electrical outlet for at least one support platform in said plurality of support platforms.

10. The cart of claim 9, wherein said plurality of electrical outlets includes at least one electrical outlet for each support platform in said plurality of support platforms.

11. The cart of claim 1, further comprising an electrical cord for carrying electrical power having a first end including a plug for insertion into an electrical outlet and a second end providing power to a plurality of electrical connectors for distributing electrical power therefrom, wherein said plurality of electrical outlets adapted for providing power to said medical manikin.

12. The cart of claim 1, wherein the upper surface of each of said plurality of support platforms is molded so as to generally conform to the substantially human-like shape of said medical manikin.

13. The cart of claim 4, wherein the upper surface of each of said support platforms is molded so as to generally conform to the substantially human-like shape of said medical manikin.

14. A cart for storing and transporting medical manikins comprising:
- a frame supported off the ground by a set of wheels to facilitate transportability of the cart;
- a plurality of generally rectangular support platforms mounted to said frame in a vertical stack, each of said support platforms comprising a generally horizontal surface suitable for receiving a medical manikin on an upper surface of each of said platforms;
  - wherein at least a first support platform in said plurality is mounted to said frame so as to be laterally extendable from a retracted position in vertical alignment with the remaining support platforms in said plurality to an extended position in which said first platform is displaced a distance of at least one-half of a first width of said platform in a horizontal direction along said first width and generally away from the central axis of said cart;
  - wherein the upper surface of at least one of said support platforms is molded so as to generally conform to the substantially human-like shape of said medical manikin;
- a plurality of electrical connectors for distributing electrical power therefrom, wherein said plurality of electrical outlets are integrated into said frame or said plurality of support platforms; and
- a battery for storing electrical power mounted to said frame, said battery providing power to said plurality of electrical connectors.

15. A cart for storing and transporting medical manikins comprising:
- a frame supported off the ground by a set of wheels to facilitate transportability of the cart;
- a plurality of generally rectangular support platforms mounted to said frame in a vertical stack, each of said support platforms comprising a generally horizontal surface suitable for receiving a medical manikin on an upper surface of said platform;
  - wherein at least a first support platform in said plurality is mounted to said frame so as to be laterally extendable from a retracted position in vertical alignment with the remaining support platforms in said plurality to an extended position in which said first platform is displaced a distance of at least one-half of a first width of said platform in a horizontal direction along said first width and generally away from the central axis of said cart;
  - wherein the upper surface of at least one of said support platforms is molded so as to generally conform to the substantially human-like shape of said medical manikin;
- a motor mounted to said cart, the motor configured to adjust the height of at least one of said plurality of support platforms with respect to said cart; and
- a battery for storing electrical power mounted to said frame, said battery providing power to said motor.

16. The cart of claim 15 further comprising an electronic control panel for controlling said motor so as to adjust the height of said at least one support platform.

17. The cart of claim 16 further comprising a second motor for automatically adjusting the height of a second support platform within said plurality of support platforms with respect to said cart.

18. The cart of claim 15, wherein said motor is further operable to automatically adjust the height of at least one of said plurality of support platforms with respect to the remaining support platforms in said plurality of support platforms.

* * * * *

UNITED STATES PATENT AND TRADEMARK OFFICE
CERTIFICATE OF CORRECTION

| | | |
|---|---|---|
| PATENT NO. | : 8,985,598 B2 | Page 1 of 1 |
| APPLICATION NO. | : 14/164899 | |
| DATED | : March 24, 2015 | |
| INVENTOR(S) | : Scott A Engum et al. | |

It is certified that error appears in the above-identified patent and that said Letters Patent is hereby corrected as shown below:

In the Claims

In column 8, line 29, in Claim 18, please replace "15" to "14".

Signed and Sealed this
Twenty-first Day of July, 2015

Michelle K. Lee
*Director of the United States Patent and Trademark Office*